US007827603B1

(12) United States Patent
Lan et al.

(10) Patent No.: US 7,827,603 B1
(45) Date of Patent: Nov. 2, 2010

(54) SYSTEM AND METHOD FOR SECURE MESSAGE REPLY

(75) Inventors: Sikun Lan, Los Angeles, CA (US);
Yong K. Huang, Los Angeles, CA (US);
Kent Frazier, Los Angeles, CA (US);
Roy Sykes, Redondo Beach, CA (US);
Joseph Zusman, Sherman Oaks, CA (US)

(73) Assignee: Citicorp Development Center, Inc., Cincinnati, OH (US)

( * ) Notice: Subject to any disclaimer, the term of this patent is extended or adjusted under 35 U.S.C. 154(b) by 1063 days.

(21) Appl. No.: 10/777,129

(22) Filed: Feb. 13, 2004

(51) Int. Cl.
G06F 9/00 (2006.01)
G06F 15/16 (2006.01)
G06F 17/00 (2006.01)

(52) U.S. Cl. .................. 726/14; 726/27; 713/155

(58) Field of Classification Search ............... 726/14, 726/27, 28; 713/155
See application file for complete search history.

(56) References Cited

U.S. PATENT DOCUMENTS

| | | | | | |
|---|---|---|---|---|---|
| 5,754,938 | A | * | 5/1998 | Herz et al. | 725/116 |
| 5,754,939 | A | * | 5/1998 | Herz et al. | 455/3.04 |
| 5,812,670 | A | * | 9/1998 | Micali | 705/74 |
| 5,878,403 | A | * | 3/1999 | DeFrancesco et al. | 705/38 |
| 5,890,140 | A | * | 3/1999 | Clark et al. | 705/35 |
| 5,991,414 | A | * | 11/1999 | Garay et al. | 713/165 |
| 5,995,947 | A | * | 11/1999 | Fraser et al. | 705/38 |
| 6,023,510 | A | * | 2/2000 | Epstein | 705/74 |
| 6,035,402 | A | * | 3/2000 | Vaeth et al. | 726/2 |
| 6,108,644 | A | * | 8/2000 | Goldschlag et al. | 705/69 |
| 6,158,044 | A | * | 12/2000 | Tibbetts | 717/100 |
| 6,192,472 | B1 | * | 2/2001 | Garay et al. | 713/165 |
| 6,208,973 | B1 | * | 3/2001 | Boyer et al. | 705/2 |
| 6,233,565 | B1 | * | 5/2001 | Lewis et al. | 705/35 |
| 6,308,277 | B1 | * | 10/2001 | Vaeth et al. | 726/10 |
| 6,363,365 | B1 | * | 3/2002 | Kou | 705/64 |
| 6,385,594 | B1 | * | 5/2002 | Lebda et al. | 705/38 |
| 6,385,614 | B1 | * | 5/2002 | Vellandi | 707/9 |
| 6,438,583 | B1 | * | 8/2002 | McDowell et al. | 709/206 |
| 6,446,206 | B1 | * | 9/2002 | Feldbaum | 713/175 |
| 6,584,564 | B2 | * | 6/2003 | Olkin et al. | 713/152 |
| 6,587,841 | B1 | * | 7/2003 | DeFrancesco et al. | 705/38 |
| 6,611,816 | B2 | * | 8/2003 | Lebda et al. | 705/38 |
| 6,622,131 | B1 | * | 9/2003 | Brown et al. | 705/38 |
| 6,654,724 | B1 | * | 11/2003 | Rubin et al. | 705/3 |
| 6,839,843 | B1 | * | 1/2005 | Bacha et al. | 713/176 |
| 6,892,222 | B2 | * | 5/2005 | McDowell et al. | 709/206 |
| 6,904,412 | B1 | * | 6/2005 | Broadbent et al. | 705/38 |
| 6,920,463 | B2 | * | 7/2005 | Kishimoto | 707/104.1 |
| 6,938,022 | B1 | * | 8/2005 | Singhal | 705/74 |
| 6,941,285 | B2 | * | 9/2005 | Sarcanin | 705/67 |

(Continued)

Primary Examiner—David Garcia Cervetti
(74) Attorney, Agent, or Firm—King & Spalding LLP

(57) ABSTRACT

A system and method whereby an unregistered, anonymous user at an organization's website makes a submission/inquiry and is able to access a secure response containing private information without pre-registering or establishing an account with the organization. A response to the user is made via an unsecured e-mail notification that provides the user with an HTTPS link to an authentication page. The user then enters his/her user identification, for example, the user email address and password which was associated with the original submission/inquiry. Once the email address and password is authenticated, the secure response message is displayed on the user's web browser in SSL. Each response is provided on a per-submission basis.

19 Claims, 2 Drawing Sheets

U.S. PATENT DOCUMENTS

| | | | | |
|---|---|---|---|---|
| 6,981,222 B2* | 12/2005 | Rush et al. | | 715/738 |
| 6,985,886 B1* | 1/2006 | Broadbent et al. | | 705/38 |
| 6,989,732 B2* | 1/2006 | Fisher | | 340/3.1 |
| 7,003,661 B2* | 2/2006 | Beattie et al. | | 713/156 |
| 7,003,799 B2* | 2/2006 | Jorgenson | | 726/12 |
| 7,010,512 B1* | 3/2006 | Gillin et al. | | 705/39 |
| 7,010,572 B1* | 3/2006 | Benjamin et al. | | 709/206 |
| 7,047,532 B1* | 5/2006 | Connelly | | 719/310 |
| 7,069,234 B1* | 6/2006 | Cornelius et al. | | 705/26 |
| 7,107,246 B2* | 9/2006 | Wang | | 705/51 |
| 7,120,929 B2* | 10/2006 | Beattie et al. | | 726/6 |
| 7,152,045 B2* | 12/2006 | Hoffman | | 705/43 |
| 7,181,427 B1* | 2/2007 | DeFrancesco et al. | | 705/38 |
| 7,200,578 B2* | 4/2007 | Paltenghe et al. | | 705/74 |
| 7,236,957 B2* | 6/2007 | Crosson Smith | | 705/50 |
| 7,272,716 B2* | 9/2007 | Haller et al. | | 713/156 |
| 7,277,549 B2* | 10/2007 | Olkin et al. | | 380/277 |
| 7,325,127 B2* | 1/2008 | Olkin et al. | | 713/152 |
| 7,334,184 B1* | 2/2008 | Simons | | 715/234 |
| 7,356,481 B2* | 4/2008 | Mitsuoka et al. | | 705/8 |
| 7,418,256 B2* | 8/2008 | Kall et al. | | 455/411 |
| 7,428,495 B2* | 9/2008 | Dhar et al. | | 705/8 |
| 7,458,079 B2* | 11/2008 | Connelly | | 719/313 |
| 7,555,459 B2* | 6/2009 | Dhar et al. | | 705/38 |
| 7,610,339 B2* | 10/2009 | Evans et al. | | 709/206 |
| 7,640,204 B2* | 12/2009 | Florance et al. | | 705/37 |
| 2001/0029472 A1* | 10/2001 | Hataguchi | | 705/26 |
| 2001/0029496 A1* | 10/2001 | Otto et al. | | 705/74 |
| 2001/0034709 A1* | 10/2001 | Stoifo et al. | | 705/51 |
| 2001/0034723 A1* | 10/2001 | Subramaniam | | 705/74 |
| 2001/0044785 A1* | 11/2001 | Stolfo et al. | | 705/74 |
| 2002/0040312 A1* | 4/2002 | Dhar et al. | | 705/8 |
| 2002/0040339 A1* | 4/2002 | Dhar et al. | | 705/38 |
| 2002/0049642 A1* | 4/2002 | Moderegger et al. | | 705/26 |
| 2002/0053021 A1* | 5/2002 | Rice et al. | | 713/155 |
| 2002/0054170 A1* | 5/2002 | Rush et al. | | 345/854 |
| 2002/0059137 A1* | 5/2002 | Freeman et al. | | 705/38 |
| 2002/0062342 A1* | 5/2002 | Sidles | | 709/203 |
| 2002/0069139 A1* | 6/2002 | Bernstein et al. | | 705/27 |
| 2002/0072975 A1* | 6/2002 | Steele et al. | | 705/14 |
| 2002/0087483 A1* | 7/2002 | Harif | | 705/76 |
| 2002/0099824 A1* | 7/2002 | Bender et al. | | 709/225 |
| 2002/0103562 A1* | 8/2002 | Kishimoto | | 700/117 |
| 2002/0107804 A1* | 8/2002 | Kravitz | | 705/51 |
| 2002/0111835 A1* | 8/2002 | Hele et al. | | 705/4 |
| 2002/0116231 A1* | 8/2002 | Hele et al. | | 705/4 |
| 2002/0165815 A1* | 11/2002 | Vincent | | 705/37 |
| 2002/0165948 A1* | 11/2002 | Vincent | | 709/223 |
| 2003/0014631 A1* | 1/2003 | Sprague | | 713/168 |
| 2003/0037232 A1* | 2/2003 | Bailiff | | 713/153 |
| 2003/0069803 A1* | 4/2003 | Pollitt | | 705/26 |
| 2003/0083986 A1* | 5/2003 | Kobayashi | | 705/39 |
| 2003/0120608 A1* | 6/2003 | Pereyra | | 705/64 |
| 2003/0158960 A1* | 8/2003 | Engberg | | 709/237 |
| 2003/0163416 A1* | 8/2003 | Kitajima | | 705/39 |
| 2003/0172120 A1* | 9/2003 | Tomkow et al. | | 709/206 |
| 2003/0179870 A1* | 9/2003 | deSa et al. | | 379/93.12 |
| 2003/0208532 A1* | 11/2003 | Kuriya | | 709/203 |
| 2003/0220867 A1* | 11/2003 | Goodwin et al. | | 705/37 |
| 2004/0078475 A1* | 4/2004 | Camenisch et al. | | 709/229 |
| 2004/0148326 A1* | 7/2004 | Nadgir et al. | | 709/200 |
| 2004/0148526 A1* | 7/2004 | Sands et al. | | 713/202 |
| 2004/0176995 A1* | 9/2004 | Fusz | | 705/10 |
| 2005/0010507 A1* | 1/2005 | Straub | | 705/35 |
| 2005/0027543 A1* | 2/2005 | Labrou et al. | | 705/1 |
| 2005/0027617 A1* | 2/2005 | Zucker et al. | | 705/26 |
| 2005/0027618 A1* | 2/2005 | Zucker et al. | | 705/26 |
| 2005/0033659 A1* | 2/2005 | Zucker et al. | | 705/26 |
| 2005/0076089 A1* | 4/2005 | Fonseca | | 709/206 |
| 2005/0114218 A1* | 5/2005 | Zucker et al. | | 705/18 |
| 2005/0177495 A1* | 8/2005 | Crosson Smith | | 705/39 |
| 2005/0177504 A1* | 8/2005 | Crosson Smith | | 705/40 |
| 2005/0187856 A1* | 8/2005 | Rabenold et al. | | 705/37 |
| 2005/0192896 A1* | 9/2005 | Hutchison et al. | | 705/40 |
| 2005/0240490 A1* | 10/2005 | Mackey | | 705/26 |
| 2006/0031301 A1* | 2/2006 | Herz et al. | | 709/206 |
| 2006/0112165 A9* | 5/2006 | Tomkow et al. | | 709/206 |
| 2006/0183463 A1* | 8/2006 | Falk et al. | | 455/411 |
| 2006/0265455 A1* | 11/2006 | Yakushev et al. | | 709/206 |

* cited by examiner

SYSTEM AND METHOD FOR SECURE MESSAGE REPLY

FIELD OF THE INVENTION

The present invention relates to a system and method for securely providing a reply via the Internet in response to an online submission made by an unregistered user. More particularly, but not by way of limitation, the present invention is a system and method for securely providing a reply containing private information to a prospect who has submitted an online submission and/or inquiry via a website without having the prospect first pre-register or establish an account.

BACKGROUND OF THE INVENTION

There is a need by organizations, such as businesses, to provide secure responses not only to an established customer, but also to an unregistered user or prospect. The prospect includes, for example, a unauthenticated visitor at a website who does not have an account with the organization associated with the website. The term "account" is not intended to be limiting and can apply to any type of record or documentation on the user, including, for example, in the context of a banking website, a credit card account, checking account, etc.

Although the capability to securely accept communications via the Internet may exist, there is not an effective and efficient way to reply to an unregistered prospect via the Internet in a secure form so that the prospect may remain anonymous. Therefore, private and/or confidential information is not included in replies to unregistered prospects via the Internet. Secure replies are limited to those registered users who have been authenticated and have an established account. Further, there is not an efficient and cost-effective way to incorporate existing infrastructure to provide the secure replies to the unregistered users.

Accordingly, there is a need for a system and method for securely providing a reply via the Internet in response to an online submission made by an unregistered user or prospect.

SUMMARY OF THE INVENTION

An embodiment of the present invention is a system and method whereby an unregistered user or prospect may go to an organization's website with a submission or inquiry, and receive a secure response from the organization without establishing an account with the organization. There is no requirement for the prospect to "log on." The submission may be, for example, a loan application made to a financial services institution. The loan application by the unregistered prospect may contain private information about the prospect which he/she sends via a secure website. The response from a customer service representative at the financial services institution is also provided in a secure manner via the Internet, although the prospect did not pre-register and remains anonymous. The response may include the prospect's private information that was in the original submission, such as, an account number, a balance, or other additional private information. Although reference is made to the Internet, other communication systems are also within the scope of the invention.

An embodiment of the present invention provides that the prospect enter a prospect-created password as part of the original submission. In a further embodiment, the password is required to satisfy certain security requirements in terms of length and character combinations so that it cannot be easily guessed by another person. A secure relationship is created on a per-submission basis. For each submission he/she sends via the website, the prospect can use a different password (a different identification). The prospect is able to retrieve a return message in a secure manner because he/she is the only one who knows what was entered as the password. The prospect remains anonymous in the transaction to protect his/her privacy. Other embodiments include providing a user name along with a password, wherein the user name is the email address of the prospect. A different email address may also be provided by the prospect as the user name. Other embodiments involve passwords and/or other types of identifiers that have been provided to the prospect.

An embodiment of the present invention comprises the following steps: A user at a personal computer, kiosk, etc. enters a website, for example a website of a mortgage lender, and completes a "contact us" form wherein the user identifies himself/herself and provides specific information. The user provides a shared password for that particular communication. In this embodiment, the information is sent to an Internet Email Workflow Application (IEWA). A customer service representative, after verifying the user and the required data, prepares a reply to the user. A copy of the reply is placed in the web server. The reply may be made available for only a specified period of time, for example, 30 days. A notification email is sent (e.g., Simple Mail Transfer Protocol) to the user to securely retrieve the reply without any additional information. The notification, for example, takes the form of providing the user with a hyperlink of a Uniform Resource Locator in the notification email and an authentication screen is displayed whereby the user is asked for his/her identification and a password. Once authenticated, the secure reply is presented to the user.

Although examples of certain types of online forms have been identified, these examples are not meant to be limiting. There are countless varieties of online forms that may be used, such as, online forms pertaining to credit cards, loans, change of addresses, registration, identification, resumes, surveys, technical problems, etc.

As discussed, an embodiment of the present invention provides for a secure dialogue on a per submission/inquiry basis. The same prospect may complete a second online form and provide a different email address as an identifier and a different password. There is no need for the prospect to register or establish a universal account. A level of anonymity is therefore maintained and privacy is enhanced. Further, the person accessing the website need not be a first-time prospect but may be an existing customer, and the submission need not be an online form but can be any type of submission pertaining to a variety of matters.

A further embodiment of the invention is a method for providing a secure response to a first party, comprising the steps of receiving a submission from the first party over a communications network, wherein the submission is directed to a second party and includes an identifier associated with the submission, and wherein the first party has not established a relationship with the second party. The steps further include receiving a response to the submission from the second party, storing the response for later retrieval by the first party or the second party, and sending a notification to the first party wherein the notification provides information for securely accessing the response. The steps also include receiving a second submission from the first party wherein the second submission comprises information for correlation to the identifier provided in the first submission, authenticating the first party, and permitting the first party to securely access the response from the second party.

DETAILED DESCRIPTION

Reference will now be made in detail to embodiments of the invention, one or more examples of which are illustrated in the accompanying drawing. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

In an embodiment of the present invention, communication is submitted by a user visiting a web site. The communication may be, for example, forms-based, meaning a form with a preset design, such as an online application form or customer service communication form. The embodiment further comprises a secure e-mail messaging system, such as, an Internet Email Workflow Application (IEWA) that supports two way messaging and allows a business to receive and process customer communications sent via the web site. Communication from the Internet user is secured using, for example, SSL with 128-bit encryption.

Once a response has been prepared to the user's submission, communication to the user is made via an unsecured e-mail notification that provides the user with an HTTPS link to an authentication page. The user then enters his/her user identification, for example, the user's email address and password which was associated with the original submission. Once the email address and password are authenticated, the secure response message is displayed on the user's web browser in SSL.

Figure 1:
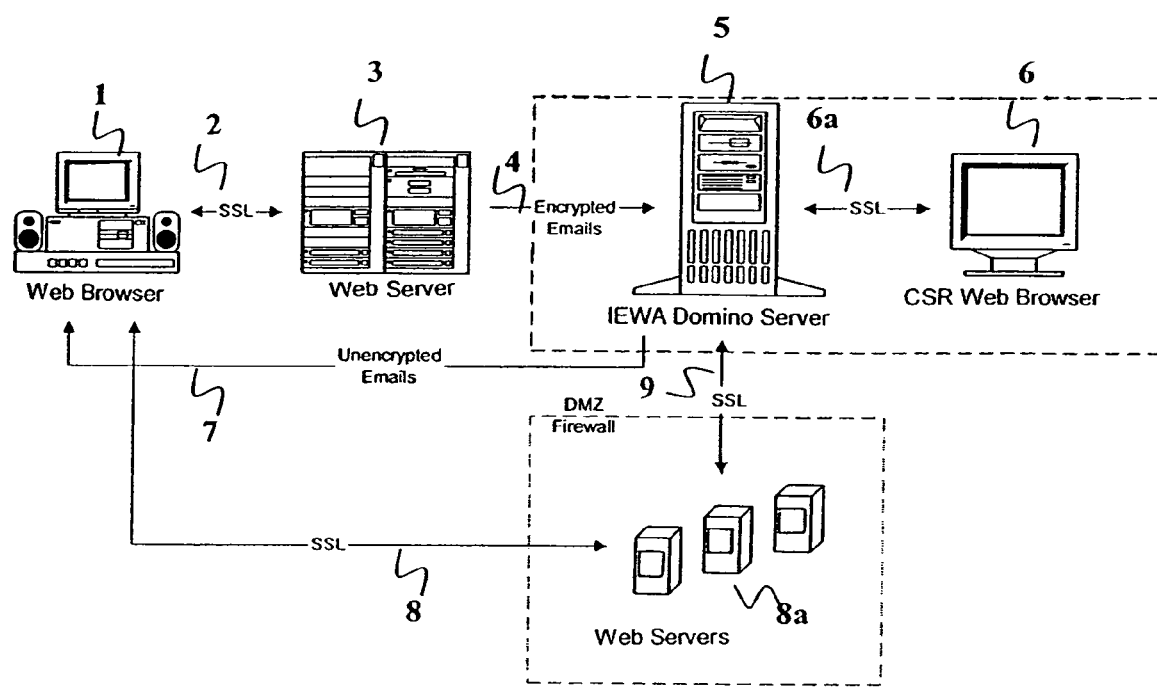
FIG. 1 is a system architecture diagram of an embodiment of the invention.

Referring now to FIG. 1, the user (customer, prospect, etc.) through his/her web browser 1 visits a web site and provides a submission, for example, by filling in and submitting an online loan application form, using a secure connection (SSL) 2. The web server 3 hosting the web site converts the form into an email message, then encrypts the message 4, for example, using Entrust, and sends it, for example, to the IEWA Domino Server 5. If a password is included in the user's submission, and a customer service representative (CSR) 6 chooses to send a secure response 6a to the user, the following process takes place in accordance with an embodiment of the invention.

IEWA saves the secure response in the secure response database residing on the same Domino server 5 as the workflow database. Also, the secure response message is saved in the history section of the original message. A notification message 7, configurable by workflow administrators, is sent to the user's email address with instructions on how to access the secure response via a web browser in SSL connection. If the above notification message 7 is bounced, IEWA locates the original message in the workflow database and marks the message status as bounced.

When the user attempts to retrieve 8, 8a the secure response in a SSL session using the link provided in the notification message, he or she is prompted to enter the email address and password that was provided in his or her initial request message. The page will make HTTPS connections 9 to the IEWA Domino Server for the secure response content. If the email address and password combination is correct, the response message will be displayed on the user's web browser in SSL. Otherwise, the user will be asked to reenter the email address and the password. If the user fails to provide the correct combination for, for example, six consecutive times, the secure response will be disabled/locked from the secure response database. Time and status of the user's attempts to retrieve the secure response is recorded in the history section of the original message. Regardless of user success or failure to retrieve the response message, the secure response is disabled/locked in the secure response database after, for example, seven days. IEWA removes the disabled/locked secure response from the secure response database after a specified number of days.

Figure 2:
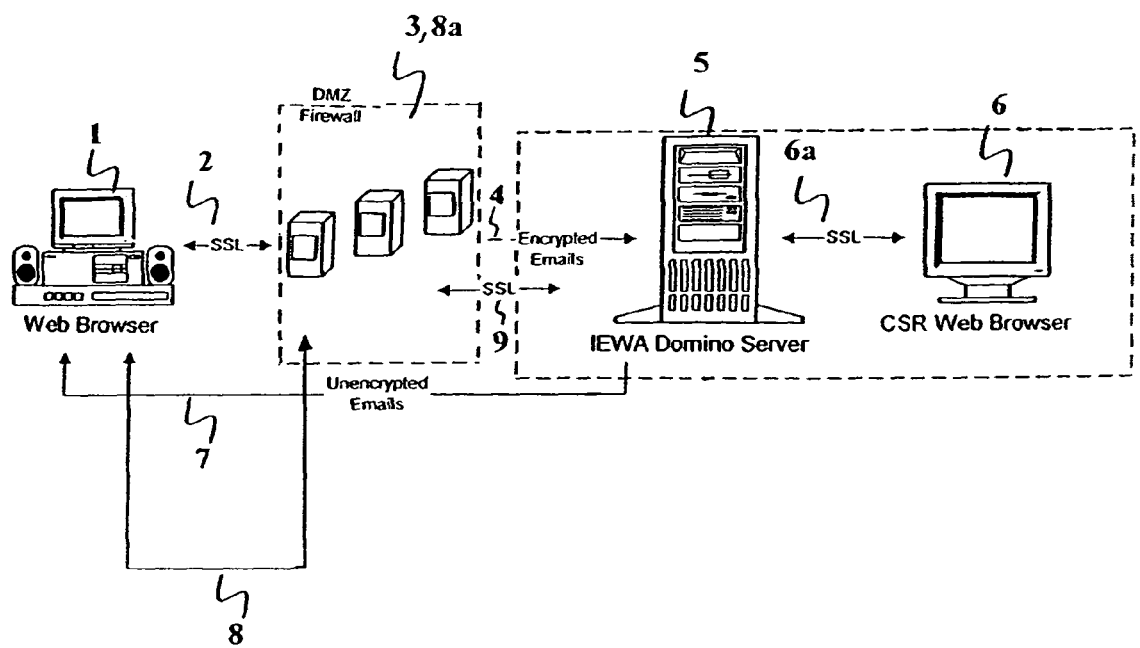
FIG. 2 is a system architecture diagram of an alternative embodiment of the invention.

FIG. 2 is an alternate embodiment of the invention and illustrates that the system architecture need not involve separate web servers as depicted by the embodiment in FIG. 1.

Embodiments of the present invention have now been described in fulfillment of the above objects. It will be appreciated that these examples are merely illustrative of the invention. Many variations and modifications will be apparent to those skilled in the art. Although examples have been provided in the context of private information related to financial matters, the invention is not limited as such and is also applicable to private information related to, for example, health and other personal matters.

The invention claimed is:

1. A method for providing a secure response to a first party, comprising the steps of:

receiving, by a server, a first submission from the first party over a communications network, wherein the first submission is directed to a second party and includes an identifier associated with the first submission, and wherein the first party is not authenticated or registered with the second party;

receiving, by a server, a response to the first submission from the second party;

storing, by a server, the response for later retrieval by the first party or the second party;

sending, by a server, a notification to the first party, wherein the notification provides information for securely accessing the response;

receiving, by a server, a second submission from the first party wherein the second submission comprises information for correlation to the identifier provided in the first submission;

authenticating, by a server, the first party; and permitting, by a server, the first party to securely access the response from the second party, wherein the first party cannot access the stored response until the first party is authenticated via the notification to the first party.

2. The method of claim 1 wherein the communications network is the Internet.

3. The method of claim 1 wherein the identifier is a password.

4. The method of claim 3 wherein the identifier further comprises a user name.

5. The method of claim 4 wherein the user name is an email address.

6. The method of claim 1 wherein the first party is a user at a client system.

7. The method of claim 6 wherein the user is a prospect.

8. The method of claim 1 wherein the first party pre-registered with the second party prior to the submission by the first party.

9. The method of claim 1 wherein the submission from the first party is forms-based.

10. The method of claim 1 wherein the submission from the first party contains private information about the first party.

11. The method of claim 1 wherein the submission from the first party is received through a secure system.

12. The method of claim 1 wherein the second party includes a customer service representative.

13. The method of claim 1 wherein the response to the submission contains private information about the first party.

14. The method of claim 1 wherein the notification is an unsecured email notification.

15. The method of claim 14 wherein if the notification is bounced, the first submission is located and marked to indicate that the notification was bounced.

16. The method of claim 1 wherein the information for securely accessing the response comprises a secure Hypertext Transfer Protocol link to an authentication page.

17. The method of claim 1 further comprising the step of:
recording the attempts to access the response.

18. The method of claim 1 further comprising the step of:
preventing access to the response after a predetermined time period.

19. The method of claim 1 further comprising the step of:
preventing access to the response after a predetermined number of failed attempts.

* * * * *

UNITED STATES PATENT AND TRADEMARK OFFICE
CERTIFICATE OF CORRECTION

| | |
|---|---|
| PATENT NO. | : 7,827,603 B1 |
| APPLICATION NO. | : 10/777129 |
| DATED | : November 2, 2010 |
| INVENTOR(S) | : Sikun Lan et al. |

It is certified that error appears in the above-identified patent and that said Letters Patent is hereby corrected as shown below:

On the Title Page, item (75);

Please correct the citizenship of Yong K. Huang from US to CN.

Signed and Sealed this
Tenth Day of April, 2012

David J. Kappos
*Director of the United States Patent and Trademark Office*